(12) United States Patent
Saha et al.

(10) Patent No.: US 7,945,663 B2
(45) Date of Patent: May 17, 2011

(54) SYSTEMS, METHODS, AND COMPUTER PROGRAM PRODUCTS FOR ADAPTIVELY ADJUSTING A REGISTRATION INTERVAL OF AN ENDPOINT

(75) Inventors: Subhra Saha, Madison, AL (US); Simon Arthur Oakley, Montgomery Village, MD (US)

(73) Assignee: GENBAND Inc., Plano, TX (US)

( * ) Notice: Subject to any disclaimer, the term of this patent is extended or adjusted under 35 U.S.C. 154(b) by 322 days.

(21) Appl. No.: 12/404,286

(22) Filed: Mar. 14, 2009

(65) Prior Publication Data

US 2010/0169478 A1    Jul. 1, 2010

Related U.S. Application Data

(60) Provisional application No. 61/141,008, filed on Dec. 29, 2008.

(51) Int. Cl.
*G06F 15/173* (2006.01)
*G06F 15/16* (2006.01)

(52) U.S. Cl. .......................... 709/224; 709/227; 709/230

(58) Field of Classification Search .......... 709/203–207, 709/217–225, 226–232, 238–245
See application file for complete search history.

(56) References Cited

U.S. PATENT DOCUMENTS

| 7,694,127 | B2 * | 4/2010 | Adams et al. ................. 713/151 |
| 7,903,661 | B2 * | 3/2011 | Biswas et al. ................. 370/392 |
| 2006/0239255 | A1 | 10/2006 | Ramachandran et al. |
| 2008/0108348 | A1 * | 5/2008 | Kottilingal et al. ........ 455/435.1 |
| 2008/0159136 | A1 | 7/2008 | Mallesan |
| 2008/0162720 | A1 | 7/2008 | Gulati et al. |
| 2009/0003315 | A1 | 1/2009 | Devdhar et al. |

OTHER PUBLICATIONS

Written Opinion of the International Searching Authority, PCT International Application No. PCT/US2009/068723, Filed Dec. 18, 2009.

* cited by examiner

*Primary Examiner* — Yasin Barqadle
(74) *Attorney, Agent, or Firm* — Olive Law Group, PLLC

(57) ABSTRACT

Methods, systems, and computer program products for adaptively adjusting a registration interval of an endpoint are provided. In an embodiment of the subject matter disclosed herein, a method of adaptively adjusting a registration interval of an endpoint comprises determining a registration interval for an endpoint associated with a binding defined at a network address translation device. The method also comprises determining a stability of the binding based on a message received from the endpoint. Further, the method comprises adjusting the registration interval for the endpoint based on the determined stability of the binding. A message can be sent to the endpoint for indicating the adjusted registration interval.

24 Claims, 6 Drawing Sheets

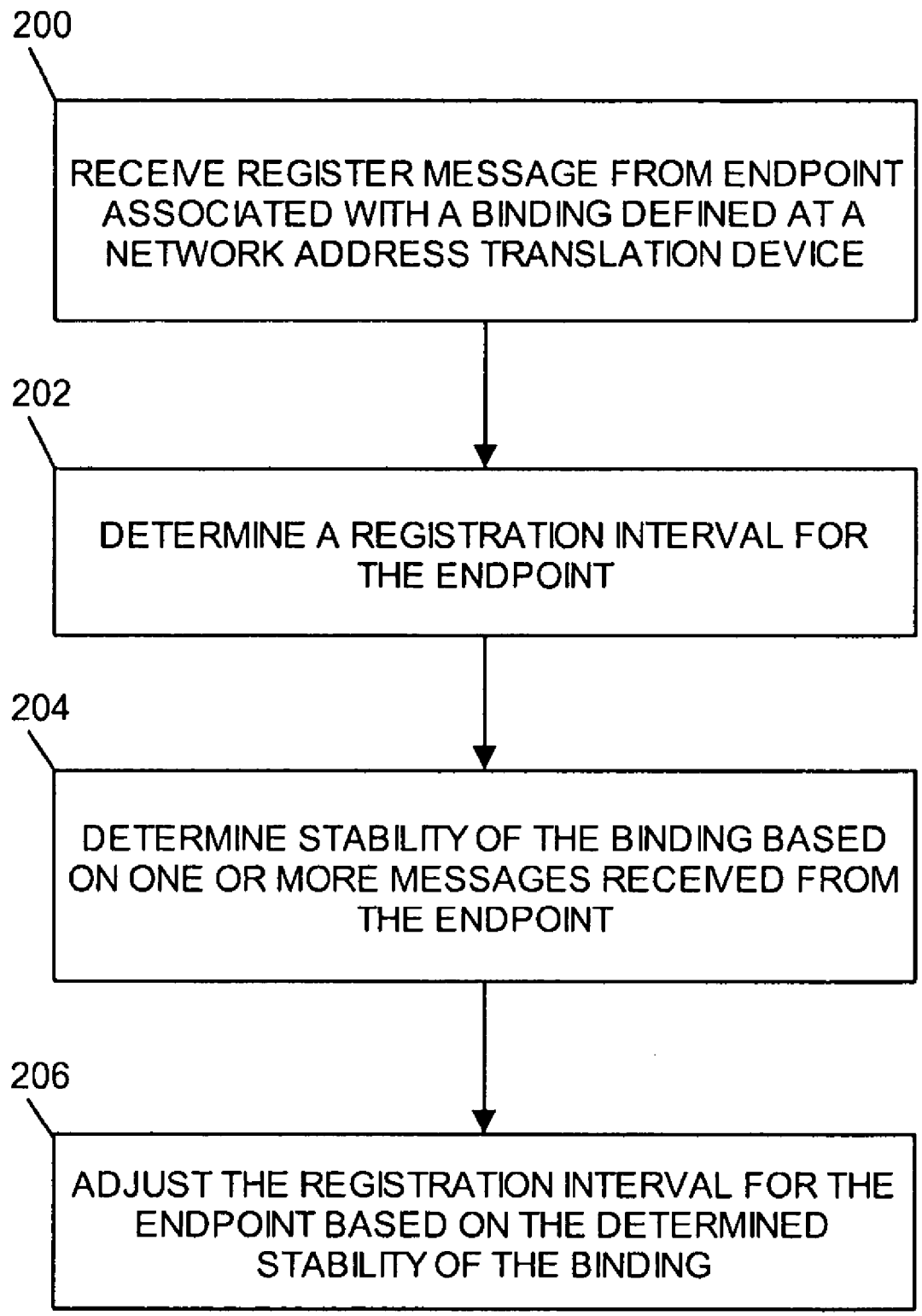

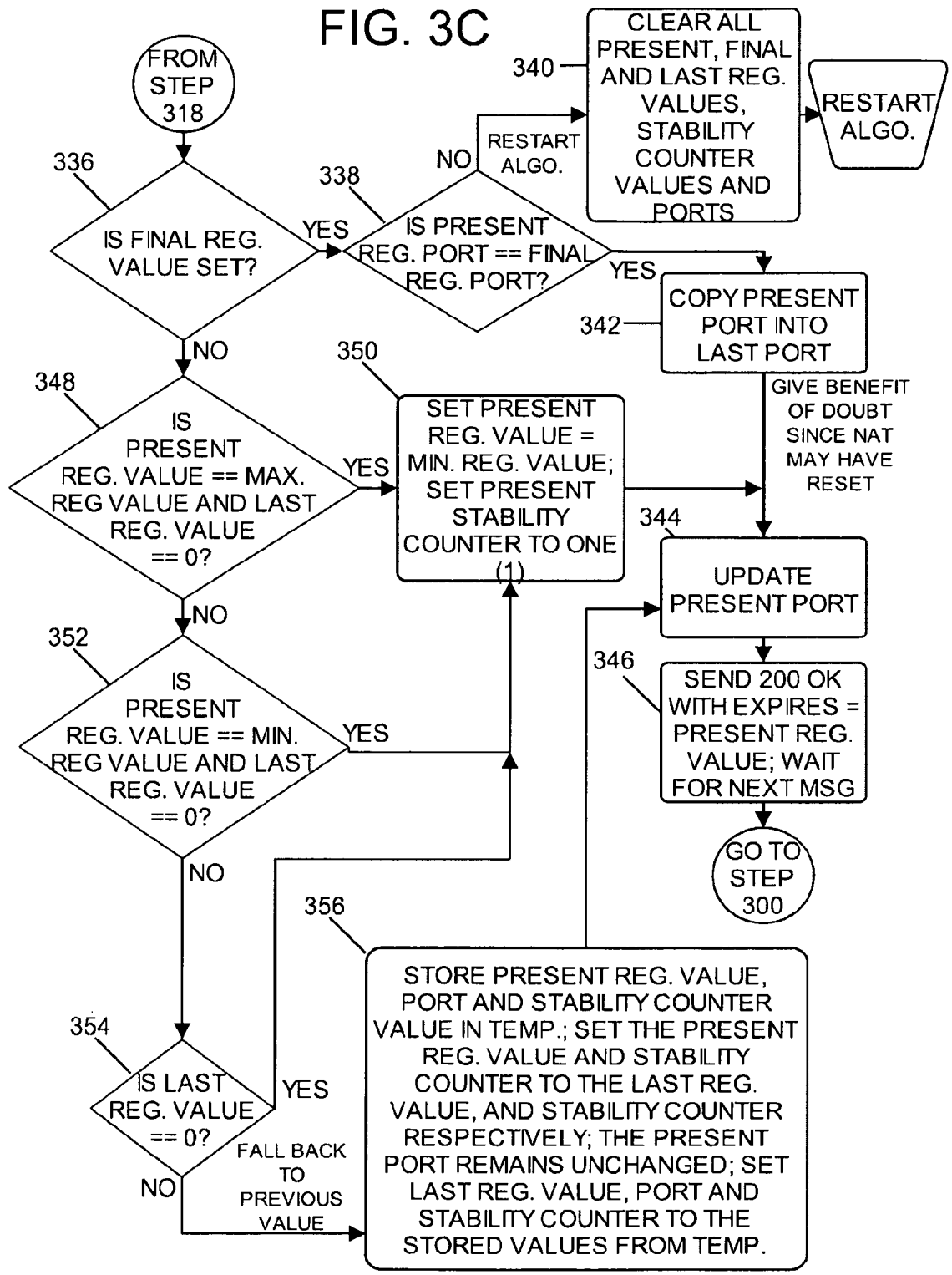

SYSTEMS, METHODS, AND COMPUTER PROGRAM PRODUCTS FOR ADAPTIVELY ADJUSTING A REGISTRATION INTERVAL OF AN ENDPOINT

CROSS REFERENCE TO RELATED APPLICATION

The present application claims priority to the commonly owned U.S. Provisional Patent Application No. 61/141,008, entitled "Adaptive Intelligent Optimal Registration Interval Determination Algorithm Ensuring High Availability" and filed Dec. 29, 2008, which is incorporated herein by reference in its entirety.

TECHNICAL FIELD

The subject matter disclosed herein relates generally to network communication sessions, and, in particular, to systems and methods for adaptively adjusting a registration interval of an endpoint in a network communication session.

BACKGROUND

There are many applications of the Internet that require the creation and management of a session, where a session is considered an exchange of data and signaling between parties or members of the session. Session initiation protocol (SIP) is an application-layer control protocol for creating, modifying, and terminating sessions, which can include network communications such as Internet telephone calls, multimedia distribution, and multimedia conferences. Parties in a session can communicate via unicast, multicast, or a mesh of unicast communications. SIP is described in Rosenberg et. al., *SIP: Session Initiation Protocol*, Internet Engineering Task Force (IETF) Request for Comments (RFC) 3261, June 2002, the disclosure of which is incorporated herein by reference in its entirety. A related protocol used to describe sessions between communicating parties is the *Session Description Protocol (SDP)*, which is described in Handley et al., SDP: Session Description Protocol, IETF RFC 4566, July 2006, the disclosure of which is incorporated herein by reference in its entirety.

With respect to Internet communications, network address translation (NAT) is a technique by which Internet protocol (IP) addresses are mapped from one realm or domain, usually private, to another, usually public, in an attempt to provide transparent routing to hosts while ensuring topology hiding and providing firewall security. This is achieved by modifying endpoint addresses en-route and maintaining a state for these updates so that messages pertaining to a session are routed to the right endpoint in either realm. IP NAT is described in Srisuresh et. al., *IP Network Address Translator (NAT) Terminology and Considerations*, Internet Engineering Task Force (IETF) Request for Comments (RFC) 2662, August 1999, the disclosure of which is incorporated herein by reference in its entirety. Network Address Port Translation (NAPT) provides network address translation like NAT, but also translates transport identifiers, such as transmission control protocol/user datagram protocol (TCP/UDP) port identifiers. Devices having NAT or NAPT functionality are interchangeably referenced as either a NAT device or a NAPT device.

NAT devices or NAPT devices bind addresses in one realm, for example a private network, with addresses in another realm, for example a global or public network. Address binding, also known as providing a "pin hole," is the phase in which a local node IP address is associated with an external address or vice versa, for purposes of translation. With respect to NAPT, a NAT device can also bind using transport identifiers, such as TCP/UDP port identifiers. Once the binding between two addresses is in place, all subsequent sessions originating from or to this host will use the same binding for session-based packet translation.

NAT devices may assume that a session has terminated after a time interval beginning when the last time a message in the session was detected on a port. A port address binding can remain unchanged until after the time interval the NAT device deems as inactivity on a port. After the NAT device determines or assumes that there is inactivity on a port, the port address binding for the port is reset, and the endpoint behind the NAT device that is associated with the binding, in the private network, will be unreachable. To reach the endpoint again, another session has to be initiated to restart communication between the endpoint and the other party or parties to the session. Accordingly, it is desirable to keep a binding unchanged, or pin hole open, until a session is explicitly terminated, not when a NAT device erroneously assumes the session to be terminated.

SUMMARY

The subject matter disclosed herein provides methods, systems, and computer program products for adaptively adjusting a registration interval of an endpoint. In an embodiment of the subject matter disclosed herein, a method of adaptively adjusting a registration interval of an endpoint comprises determining a suitable registration interval for an endpoint associated with a binding defined at a network address translation device. The method also comprises determining a stability of the binding based on one or more messages received from the endpoint. Further, the method comprises adjusting the registration interval for the endpoint based on the determined stability of the binding. A message can be sent to the endpoint to indicate the adjusted registration interval.

In another embodiment of the subject matter disclosed herein, a system for adaptively adjusting a registration interval of an endpoint comprises a registration interval manager. The registration interval manager is configured to determine a registration interval for an endpoint associated with a binding defined at a network address translation device. Further, the registration interval manager is configured to determine a stability of the binding based on a message received from the endpoint. The registration interval manager is also configured to adjust the registration interval for the endpoint based on the determined stability of the binding.

BRIEF DESCRIPTION OF THE DRAWINGS

The foregoing summary, as well as the following detailed description of embodiments, is better understood when read in conjunction with the appended drawings. For the purposes of illustration, there is shown in the drawings exemplary embodiments; however, the disclosed subject matter is not limited to the specific methods and instrumentalities disclosed. In the drawings:

FIG. 2 is a flow chart of an exemplary method that can be utilized by a registration interval manager for adaptively adjusting a registration interval of an endpoint, according to an embodiment of the subject matter disclosed herein;

FIGS. 3A, 3B, and 3C are a flow chart of the exemplary method in greater detail for adaptively determining and suitably adjusting a registration interval of an endpoint, according to an embodiment of the subject matter disclosed herein.

DETAILED DESCRIPTION

In the following detailed description of example embodiments, reference is made to the accompanying drawings which form a part hereof, and in which is shown, by way of illustration, specific embodiments of the subject matter disclosed herein may be practiced. It is to be understood that other embodiments may be utilized and structural changes may be made without departing from the scope of this description.

The subject matter disclosed herein is directed to systems, methods, and computer program products for adaptively adjusting a registration interval of an endpoint. Particularly, the subject matter disclosed herein includes systems, methods, and computer program products for adaptively adjusting a registration interval of an endpoint associated with a binding defined at a network address translation (NAT) device. A registration interval of the endpoint can be determined and adjusted based on a determined stability of a binding for the endpoint. The stability of the binding can be determined based on REGISTER messages received from the endpoint via the NAT device. The registration interval can be adaptively adjusted to the binding for keeping the binding unchanged. The registration can be adjusted such that the registration interval is set to a maximal or near maximal time period while keeping the binding unchanged. The registration interval can be adjusted by sending a message to the endpoint for indicating the adjusted registration interval. The subject matter disclosed herein can be advantageous, for example, because it can ensure high availability of endpoints and takes into account variations in packet reception due to network delay.

Figure 1:
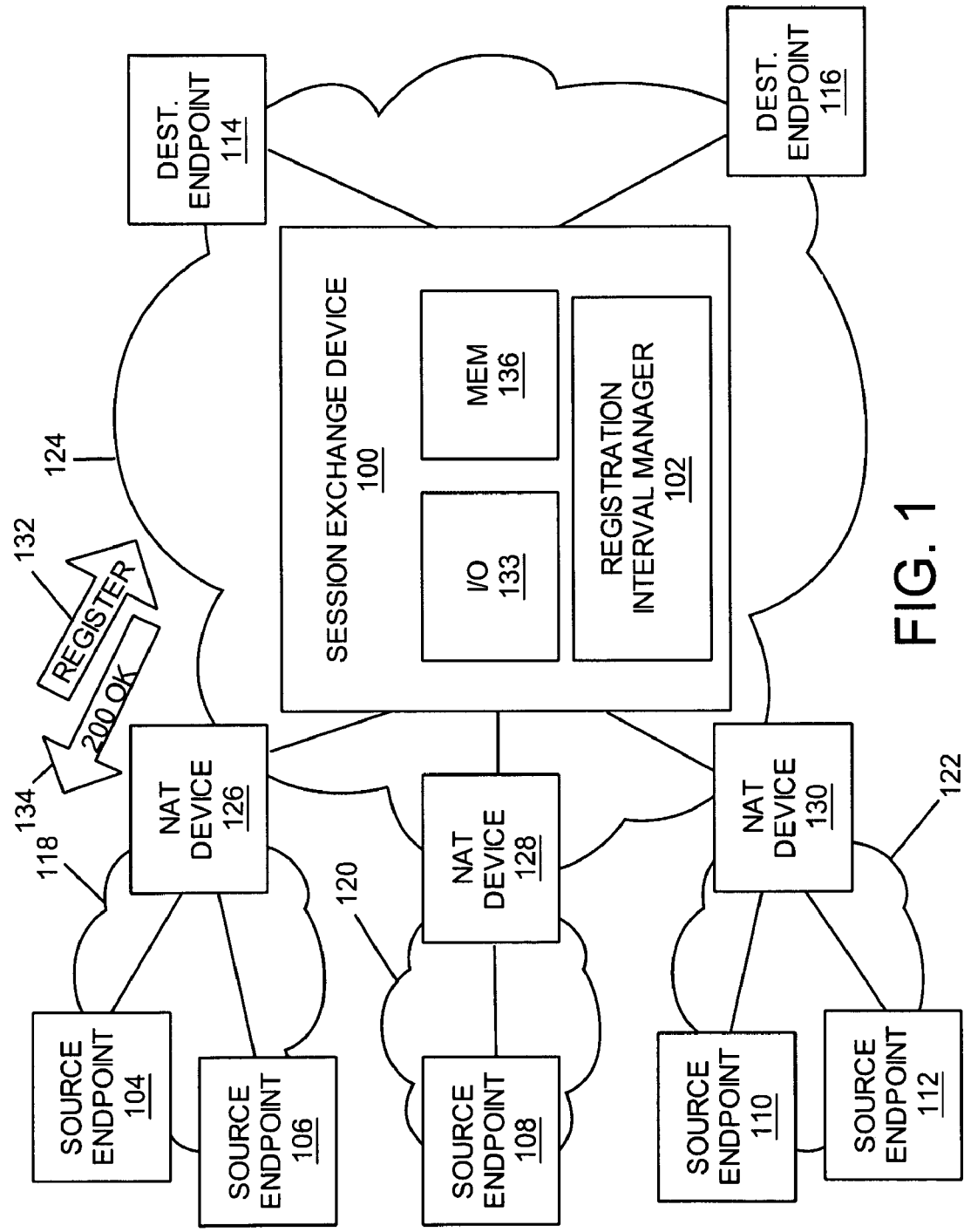
FIG. 1 is a schematic diagram of a session exchange device including a registration interval manager operable to adaptively adjust registration intervals for endpoints participating in communication sessions, according to an embodiment of the subject matter disclosed herein.

FIG. 1 is a schematic diagram that illustrates a session exchange device 100 including a registration interval manager 102 operable to adaptively adjust registration intervals for endpoints participating in communication sessions, according to an embodiment of the subject matter disclosed herein. Referring to FIG. 1, source endpoints 104, 106, 108, 110, and 112 can participate in communication sessions with destination endpoints 114 and 116. Endpoints 104 and 106 can operate in a private network 118, endpoint 108 can operate in network 120, and endpoints 110 and 112 can operate in network 122. Session exchange device 100 and endpoints 114 and 116 can operate in network 124. Session exchange device 100 can function as a session border controller (SBC) or can be associated with a SBC. The networks can each be a wireless or wired network configured to transmit data and/or media content such as voice content and/or video content. For example, portions of each network can be used for media over Internet protocol (MoIP) sessions, such as voice over Internet protocol (VoIP) sessions. Endpoints can include, but are not limited to, SIP phones, computers, or any other suitable electronic device.

Session exchange device 100 can be, for example, multi-protocol session exchange devices configured to establish, control, and monitor connections between the endpoints. Further, session exchange device 100 can be connected with a network controller (not shown) that is a centralized management component that controls, configures, and coordinates network 124. Session exchange device 100 can be configured to function as an interface device between different endpoints, for example, at the borders of network 124 (e.g., session border controller). More specifically, session exchange device 100 can be configured to receive and process SIP messages transmitted between source endpoints 104, 106, 108, 110, and/or 112 and endpoints 114 and/or 116.

When a communication session is established between a source endpoint and a destination endpoint, the source endpoint communicates REGISTER messages to session exchange device 100 via a NAT device, such as NAT devices 126, 128, and 130, which map addresses between a network 124 and networks 118, 120, and 122, respectively. Particularly, NAT devices 126, 128, and 130 can provide translation of IP addresses and transport identifiers between network 124 and networks 118, 120, and 122, respectively. The NAT devices can apply IP address and transport identifier binding to a source endpoint and a destination endpoint involved in an active communication session. Once the binding is in place, the NAT device can use the same binding for session-based packet translation between the endpoints.

SIP provides a registration function that allows a session participant to indicate its current location for use by proxy servers, or other network elements. Registration creates bindings in a location service for a particular domain that associates an address-of-record uniform resource identifier (URI) with one or more contact addresses. For example, at periodic intervals, each of the source endpoints 104, 106, 108, 110, and 112 can send REGISTER messages to session exchange device 100, functioning as a SIP registrar server. A REGISTER message associates the participant's SIP URI with the endpoint into which the participant is currently logged. The registrar writes this association to a database, called the location service. This stored information can be used by other proxies, or network elements, to locate the session participant.

Registration is soft state and expires unless refreshed, but can also be explicitly removed. When an endpoint sends a REGISTER message, it may suggest, in an Expires field of the message, an expiration or registration interval that indicates how long the participant would like the registration to be valid. A registrar may accept the proposed registration interval or force the endpoint to accept a different registration interval by proposing a different value in the Expires field of the 200 OK response. In accordance with the subject matter disclosed herein, registration interval manager 102 determines and sets a registration interval for the endpoint. Registration interval manager 102 sets the registration interval so as to keep the NAT binding for the respective endpoint open. Further, registration interval manager 102 determines a stability of the NAT binding based on one or more REGISTER messages received from the endpoint, and adaptively adjusts the registration interval for the endpoint based on the determined stability of the binding.

The registration interval determined by registration interval manager 102 can be communicated to the endpoint. For example, the registration interval can be communicated to the endpoint in an Expires field of a 200 OK message sent in response to a REGISTER message. In this example, registration interval manager 102 is a part of session exchange device 102, but, in the alternative, the registration interval manager may be a part of any other suitable network device having other functionality, or the registration interval manager may primarily be the only functionality of a network device. Registration interval manager 102 can be a software-based (e.g., set of instructions executable at a processor, software code) and/or hardware-based (e.g., processor, application-specific integrated circuit (ASIC), field programmable gate array (FPGA) management engine configured to receive (e.g., intercept) at least a portion of an IP message transmitted between any of the endpoints, to process the message, and respond to the message. Session exchange device 100 may include suitable input/output modules capable of receiving messages, such as REGISTER messages, and sending messages, such as 200 OK messages. In accordance with the subject matter disclosed herein, the endpoint can receive the 200 OK message and set its registration interval in accordance with the value indicated in the message's Expires field.

More particularly, FIG. 2 is a flow chart that illustrates an exemplary method that can be utilized by a registration interval manager for adaptively adjusting a registration interval of an endpoint, according to an embodiment of the subject matter disclosed herein. In this example, the method is implemented by registration interval manager 102 shown in FIG. 1. Referring to FIGS. 1 and 2, this exemplary method is initiated when session exchange device 100 receives a REGISTER message 132 from source endpoint 104, although the method can be initiated by any other suitable means (step 200). Session exchange device 100 can include input/output (I/O) module(s) 133 for receiving and sending messages. Endpoint 104 is involved in a communications session with endpoint 114, and NAT device 126 provides address and transport identifier translation and other NAPT services for the session. More particularly, NAT 126 has established a binding for the session associated with a binding defined at NAT device 126.

REGISTER message 132 includes an Expires field and a Contact field. The Expires field contains a value indicating a registration interval requested by the endpoint. The Contact field can include an IP address and a port identifier identifying an IP address and a port identifier of the private network 118. In addition, the Via header in the SIP messages from endpoint 104 can contain the private IP address of device 104. A Via header is inserted by all endpoints that generate a SIP message and it contains the IP address, port and transport protocol used by the device. The IP address and the port in the IP packet, which encapsulates the SIP REGISTER message, can contain the IP address and port of the NAT device 126 from which the message was received. A mismatch of the IP address in the IP layer of the packet with the IP address in the Via header of the SIP message indicates, to the device 100, the presence of a NAT in the path. The Expires value in the REGISTER message, contact address in the REGISTER message, IP address and port identifier in the IP layer of the encapsulating IP packet may be stored in a memory 134 of registration interval manager 102, or another memory accessible by registration interval manager 102. REGISTER message 120 may also include the following fields: a Request-URI field for naming the domain of the location service for which the registration is meant (for example, "sip:chicago.com"); a To header field for containing the address of record whose registration is to be created, queried, or modified; and a From header field for containing the address-of-record of the person responsible for the registration.

In step 202, registration interval manager 102 determines a registration interval for endpoint 104. Particularly, for example, registration interval manager 102 can maintain and store an operator-configurable maximum registration value and minimum registration value. The maximum registration value represents a maximum registration interval allowed for an endpoint registering with the device 100. The minimum registration value represents a minimum registration interval allowed for an endpoint registering with the device 100. In an example, the maximum registration value and minimum registration value are set by an operator to 180 seconds and 30 seconds, respectively, although the values may be set to any suitable times.

If the endpoint has not registered with the session exchange device and the Expires value in the REGISTER message is greater than or equal to the maximum registration value, the registration interval for the endpoint is set to the maximum registration value. Otherwise, if the endpoint has not registered with the session exchange device and the Expires value is less than the maximum registration value, the registration interval for the endpoint is set to the Expires value. The endpoint can be set with the registration interval by sending a 200 OK message 134 to the endpoint with the Expires value of the 200 OK message at the registration interval. The endpoint receives the 200 OK message and updates its registration interval in accordance with the registration interval indicated in the 200 OK message. The objective of doing this is to ensure that the device 100 is not overloaded by starting the algorithm for all endpoints at the same time when the device is turned on. It is very likely that some endpoints will propose, and their NAT devices will support, a binding of maximum registration interval in which the optimal registration interval is determined outright.

In step 204, registration interval manager 202 determines a stability of the binding based on one or more messages received from endpoint 104. After the registration interval of the endpoint has initially been set, registration interval manager 202 can determine a stability of the NAT binding based on subsequent messages received from the endpoint. In an example, the stability determination can be made each time a REGISTER message with the same or different NAT binding is received from the endpoint.

In an example of determining stability of a NAT binding, registration interval manager 202 can maintain and store a present stability counter and a global stability counter for the NAT binding. The present stability counter can indicate a NAT binding stability level by maintaining a count of the number of times a REGISTER message has been received from the same NAT binding while the register interval is set at a particular interval. For example, if the register interval is set to 40 seconds, the present stability counter can be incremented each time a REGISTER message is received from an endpoint, while the endpoint is associated with a particular binding and the register interval is set to 40 seconds. Thus, the higher the count of the present stability counter, the higher the stability of the NAT binding. The global stability can be operator-configured to a number that is compared to the present stability counter for determining if the NAT binding is stable at the present registration interval. In an example, the global stability counter can be set to five (5), and the present stability counter can be incremented by one. If the present stability counter is incremented such that it equals the global stability counter, the NAT binding may be considered stable at the present registration interval. If the NAT binding for the endpoint switches to a different binding, the present stability counter may be cleared or reset, and the stability determined for the new binding.

In step 206, registration interval manager 102 adjusts the registration interval for the endpoint based on the determined stability of the binding. For example, if the value of the present stability counter equals the global stability counter such that the NAT binding is considered stable for the registration interval, a greater registration interval within the bounds of the maximum registration value may be used to determine if the NAT binding will be stable at the longer registration interval. In an example, the registration interval may be adjusted by communication to the endpoint of a message, such as a 200 OK message, having an Expires field indicating the adjusted registration interval. After step 206, the method may return to step 200 to await the receipt of another REGISTER message from endpoint 104.

Figure 3A:
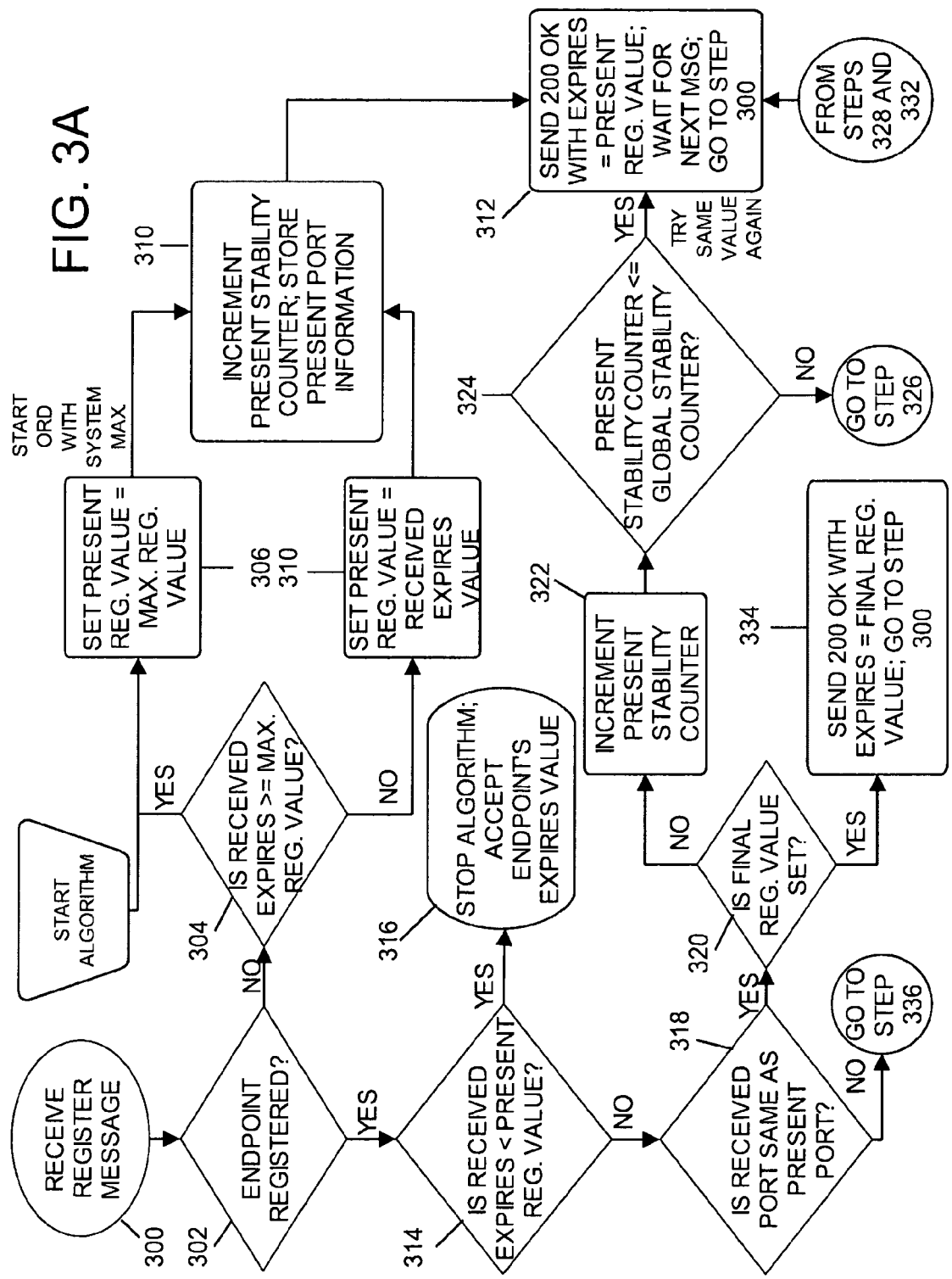
Figure 3B:
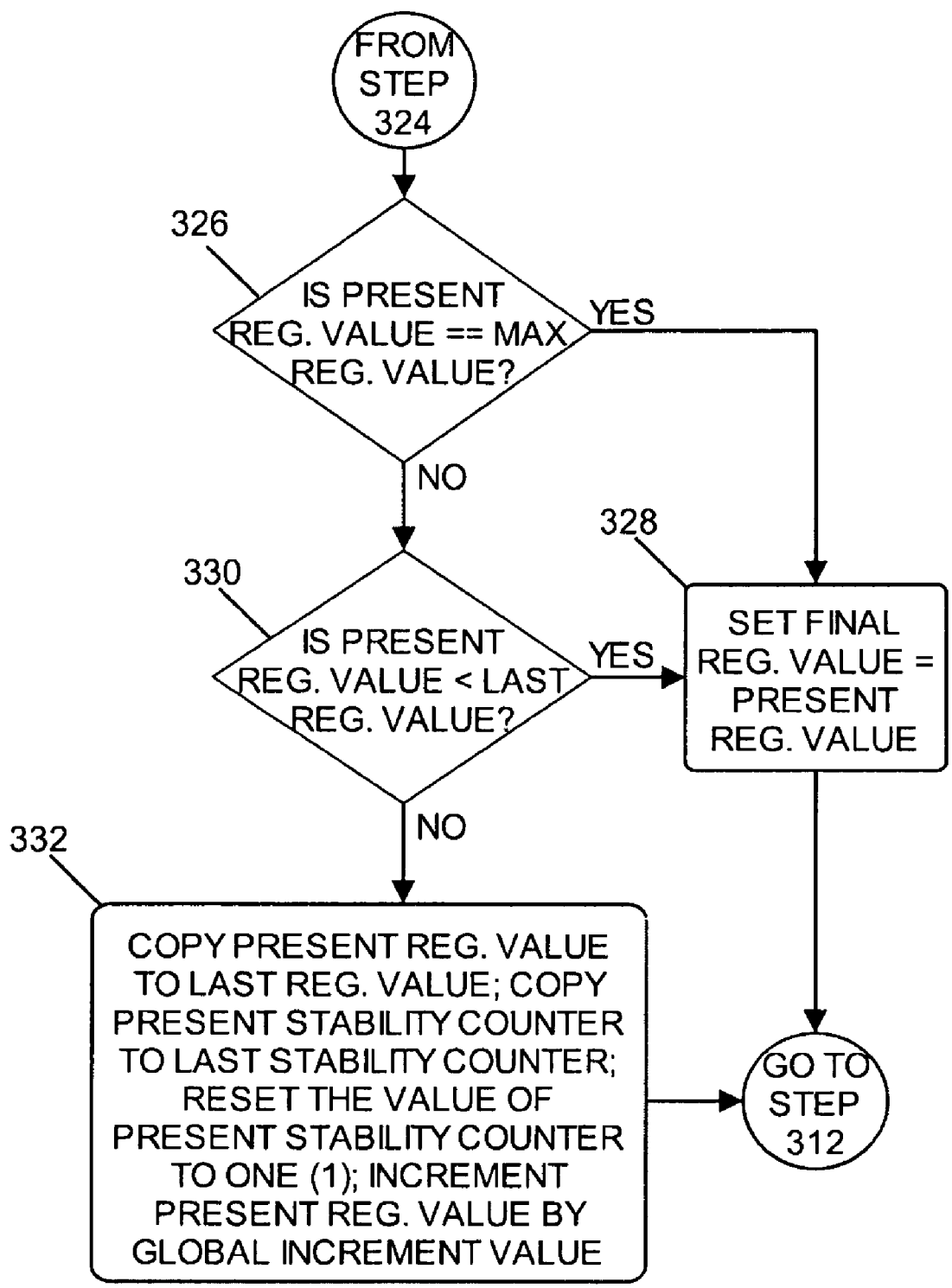

A more detailed example of a method for adaptively determining and suitably adjusting a registration interval of an endpoint, according to an embodiment of the subject matter disclosed herein, is illustrated in the flow chart of FIGS. 3A, 3B, and 3C. Referring to FIGS. 3A, 3B, and 3C, REGISTER message 132 is received at the registration interval manager 102 shown in FIG. 1 (step 300). SIP REGISTER message 132 can be received from an endpoint, such as the endpoint 104 shown in FIG. 2, via a NAT, such as NAT 126 shown in FIG. 1. REGISTER message 132 should include an Expires field having a value indicating an expiration interval that the endpoint would like registration of the endpoint to be valid. Further, the IP packet encapsulating the SIP REGISTER message 132 includes a port identifier for identifying a port on the NAT in addition to the public IP of the NAT device. It can be assumed that the port identified in the SIP REGISTER message is the pin hole, or binding, for the endpoint at NAT device 126.

At step 302, registration interval manager 102 determines whether endpoint 104 associated with the received REGISTER message is registered. For example, registration interval manager 102 can access a memory 136 to determine whether endpoint 104 is registered with the registrar function of session exchange device 100. If it is determined at step 302 that the endpoint is not registered, registration interval manager 102 determines whether the Expires value contained in REGISTER message 132 is greater than or equal to the maximum registration value (step 304). The maximum registration value can be stored in memory 136, or another suitable memory accessible by the registration interval manager. The maximum registration value can be configured by an operator of the registration interval manager.

If it is determined at step 304 that the Expires value is greater than or equal to the maximum registration value, the present registration value for the endpoint is set to the maximum registration value (step 306). For example, if the maximum registration value is set to 180 seconds and the Expires value is 200 seconds, the present registration value is set to 180 seconds. In addition, at step 308, the present stability counter is incremented. For example, the counter can be incremented by one (1). The present stability counter is used to keep track of the stability of the binding. In an example, the stability counter can be set at zero (0) when an endpoint is initially registered, and increased by one on each counter increment step in the process. The higher the number of the present stability counter, the higher the stability of the NAT binding at the registration value. In this exemplary process, as described in more detail herein, the present stability counter may be compared to a configurable global counter to determine stability.

Further, in step 308, the present port value is set equal to the port identifier contained in the received REGISTER message. The present port value can be used, as described in more detail herein, to determine whether the subsequent REGISTER message received from the endpoint is received from a different port of the NAT device.

If it is determined at step 304 that the Expires value is not greater than or equal to the maximum registration value, the present registration value for the endpoint is set to the Expires value (step 310). Next, at step 308, the stability counter is incremented, and the present port value for the endpoint is stored in memory 136.

At step 312, the registration interval manager 102 generates 200 OK message 134 for responding to the REGISTER message. 200 OK message 134 contains an Expires field set to the present registration value for endpoint 104. The 200 OK message can be sent to endpoint 104 via I/O module 133. The endpoint can receive the message, extract the value contained in the Expires field, and set its registration interval equal to the value in the Expires field. The endpoint can send REGISTER messages at intervals equal to the registration interval. The method can then return to step 300 to wait for another REGISTER message. It is noted that REGISTER message 132 shown in FIG. 1 can be representative of one or more REGISTER messages sent by source endpoint 104 to session exchange device 100.

Returning to step 302, if it is determined at step 302 that the endpoint associated with the received REGISTER message is registered, registration interval manager 102 determines whether the Expires value contained in the REGISTER message is less than the present registration value for the endpoint (step 314). If it is determined that the Expires value is less than the present registration value, the Expires value contained in the REGISTER message is accepted, a 200 OK message including the Expires value can be sent to the (step 316). The process can assume that a binding will be stable at a requested Expires value that is less than the present registration value. At this point it is assumed that the endpoint may be trying to optimize the registration interval and so the process at the server endpoint 100 is stopped.

At step 314, if it is determined that the Expires value is not less than the present registration value, registration interval manager 102 determines whether the port identified in the REGISTER message is the same port indicated by the present port value (step 318). For example, the present port value for the endpoint can be compared to the port identifier in the latest-received REGISTER message to determine if the message has been received from a different port than a previously-received message. If it is determined that the port identified in the received message is the same as the present port value, registration interval manager 102 determines whether a final registration value for the endpoint is set (step 320). In this example, the registration interval manager can determine whether the final registration value for the endpoint is set by examining the final registration value in the memory module 136. The final registration value for an endpoint is zero (0) at initial registration, and can subsequently be set to a value greater than zero as described in more detail herein. The final registration value is set if its value is greater than zero. If it is determined that the final value is not set at step 320, the present stability counter is incremented (step 322).

At step 324, registration interval manager 102 determines whether the present stability counter is less than or equal to the global stability counter. If it is determined that the present stability counter is less than or equal to the global stability counter, the method can proceed to step 312, where registration interval manager 102 can generate 200 OK message 134 for responding to the REGISTER message. The 200 OK message has an Expires value set to the present registration value for the endpoint. It is noted that 200 OK message 134 shown in FIG. 1 can be representative of one or more 200 OK messages sent by session exchange device 100 to endpoint 104. After sending the 200 OK message, the method can then return to step 300 to wait for receipt of another REGISTER message.

If it is determined that the present stability counter is not less than or equal to the global stability counter at step 324, registration interval manager 102 determines whether the present registration value is equal to the maximum registration value (step 326). If it is determined that the present registration value and the maximum registration value are equal, the final registration value, described in more detail herein below, is set to the present registration value (step 328). Next, the method can proceed to step 312 where registration interval manager 102 can generate 200 OK message 134 for responding to the REGISTER message. The 200 OK message has an Expires value set to the present registration value for the endpoint. The method can then return to step 300 to wait for another REGISTER message.

At step 326, if it is determined that the present registration value and the maximum registration value are not equal, registration interval manager 102 determines whether the present registration value is less than the last registration value (step 330).

At step 330, if it is determined that the present registration value is not less than the last registration value, the present registration value is copied to the last registration value, the present registration counter is copied to the last stability counter, the value of the present stability counter is set to one (1), and the present registration value is incremented by the global increment value (step 332). The global increment value is configurable by an operator of registration interval manager 102. The objective at this point is to find the next higher registration interval that can be supported within the bounds set by the configurable maximum registration interval. For example, the global increment value can be set to 15 seconds, and the present registration value set the incremented present registration value to test whether the binding is stable at the higher value. It is desirable to set the registration interval at a higher value, if stable at the value for the binding, in order to reduce the number of registrations for the endpoint, thereby increasing efficiency.

At step 330, if the present registration value is less than the last registration value, the final registration value, described in more detail herein below, is set to the present registration value (step 328). This happens when an endpoint's registration value was incremented by global increment counter after 'n' (where n=global stability counter) REGISTER messages from the same port binding were received with a lower registration interval. But the updated incremented registration interval was more than the NAT binding interval and so the algorithm fell back to the previously successful lower registration value. The updated registration interval was stored as the last registration value and the lower registration value was stored as the present registration value at step 330. Next, the method can proceed to step 312 where registration interval manager 102 can manage the generation of a 200 OK message for responding to the REGISTER message. The 200 OK message has an Expires value set to the present registration value for the endpoint. The method can then return to step 300 to wait for another REGISTER message.

Returning to step 320, if it is determined that the final registration value is set (and if the port identified in the received REGISTER) message is the same as the present port value, registration interval manager 102 can generate a 200 OK message having an Expires value set to the final registration value (step 334). The 200 OK message can then be sent to the endpoint. The method can then return to step 300 to wait for another REGISTER message.

At step 318, if it is determined that the port identified in the received message is not the same as the port identified by the present port value, registration interval manager 102 determines whether a final registration value for the endpoint is set (step 336). If it is determined that the final registration value is set, registration interval manager 102 determines whether the present port value is equal to the final port value. This comparison is essential to determine if the change in port from which the REGISTER message was received was because of the NAT device resetting or because of a genuine change in the port binding interval in the NAT device to a lower value than determined previously or the NAT device itself replaced by another with a different NAT binging interval support. If the NAT device resets then only the first REGISTER message after the reset will have a new port but the subsequent REGISTER messages will continue to use the same (new) port. But if the port binding in the NAT device was changed to a lower value each REGISTER message received subsequently will have a different port since the determined final registration value is greater than the new NAT binding time.

Step 338 is the case where two consecutive REGISTER messages were received from two different ports from the endpoint for which the final registration value was already determined. When the first REGISTER from a new port is received, then the present port is updated with that value. But when the subsequent REGISTER message is received from yet another port the values in the present port and final port are different from the port in the received REGISTER message. This indicates that two consecutive REGISTER messages have been received from two different ports. Thus, in step 338, if it is determined that the present port value is different from the final port value, registration interval manager 102 clears the present registration value, the final registration value, the last registration value, the stability counter value, and port values for restarting the process (step 340) and returning to step 300. This is the case where the port binding interval was lowered in the NAT device or the NAT device was replaced by another and so the algorithm to determine the optimal registration algorithm has to be restarted.

If it is determined, at step 338, that the present port value is the same as the final port value but the port in the received REGISTER message is different from the present port value, the present port value is copied as the last port value (step 342), and the present port value is then updated with the port information identified in the last-received REGISTER message (step 344). If the process reaches step 342, it has been determined that the NAT device may have reset and that the port was not changed by the NAT device based on inactivity of the endpoint on the port. Only the subsequent REGISTER, if received from a new port, will indicate if the NAT device has lowered the NAT binding. Registration interval manager 102 generate and sends a 200 OK message having an Expires value set to the present registration value, which is equal to the final registration value, for the endpoint (step 346). The method can then return to step 300 to wait for another REGISTER message.

Returning to step 336, if it is determined that the final registration value is not set, registration interval manager 102 determines whether the present registration value equals the maximum registration value, and determines whether the last registration value equals zero (step 348). If it is determined that the present registration value equals the maximum registration value and the last registration value equals zero, the present registration value is set to the minimum registration value, and the present stability counter is set to one (1) (step 350). This implies that the endpoint had either sent a value higher than the maximum registration interval or the maximum registration interval as the Expires value in the previous REGISTER message but its NAT binding does not last that duration as indicated in the received REGISTER message. At this point the algorithm is started afresh with an Expires of minimum registration interval to find the optimal registration interval.

If it is determined, at step 348, that either the present registration value does not equal the maximum registration value and the last registration value does not equal zero, registration interval manager 102 determines whether the present registration value equals the minimum registration value, and determines whether the last registration value equals zero (step 352). If it is determined that the present registration value equals the minimum registration value and the last registration value equals zero, the present registration value is set to the minimum registration value, and the present stability counter is set to one (step 350). This implies that the endpoint had sent the minimum registration interval as the Expires value in the previous REGISTER message but its NAT binding does not last that duration as indicated in the last REGISTER message. At this point the algorithm is started afresh with an Expires of minimum registration interval to find the optimal registration interval. The algorithm continues since it can't lower the registration interval below the minimum registration interval and in the hope that it may be able to find a higher interval if the configuration to close NAT pinhole bindings at the NAT device are modified. The present port value is then updated with the port information contained in the last-received REGISTER message (step 344). Next, registration interval manager 102 can manage the generation of a 200 OK message having an Expires value set to the present registration value for the endpoint (step 346). The method can then return to step 300 to wait for another REGISTER message.

Returning to step 352, if it is determined that the present registration value does not equal either the minimum registration value or the maximum registration value, then the registration interval manager 102 determines whether the last registration value equals zero (step 354). If it is determined that the last registration value equals zero, the present registration value is set to the minimum registration value, and the present stability counter is set to one (step 350). The present port value is then updated with the port information identified in the last-received REGISTER message (step 344). Next, registration interval manager 102 can manage the generation of a 200 OK message having an Expires value set to the present registration value for the endpoint (step 346). The method can then return to step 300 to wait for another REGISTER message.

If it is determined, at step 354, that the last registration value does not equal zero, registration interval manager 102 stores the present registration value, present port identifier, and present stability counter value in temporary memory (step 356). Further, the present registration value, and present stability counter are set to the last registration value and the last stability counter, respectively. The present port value remains unchanged. Further, the last registration value, last port value, and last stability counter are set to the values retrieved from temporary memory. This is the condition when the registration interval was incremented by global increment value and the subsequent REGISTER message was received from a different port indicating that the proposed Expires value in the previous REGISTER message exceeded the NAT binding interval. At this point the algorithm falls back to the previous stable registration interval which was stored as the last registration value. Thus if at this point the optimal registration interval is determined and the algorithm stops till two consecutive REGISTER messages are received from different ports.

Following step 356, the present port value is then updated with the port information identified in the last-received REGISTER message (step 344). Next, registration interval manager 102 can manage the generation of a 200 OK message having an Expires value set to the present registration value for the endpoint (step 346). The method can then return to step 300 to wait for another REGISTER message.

Figure 4:
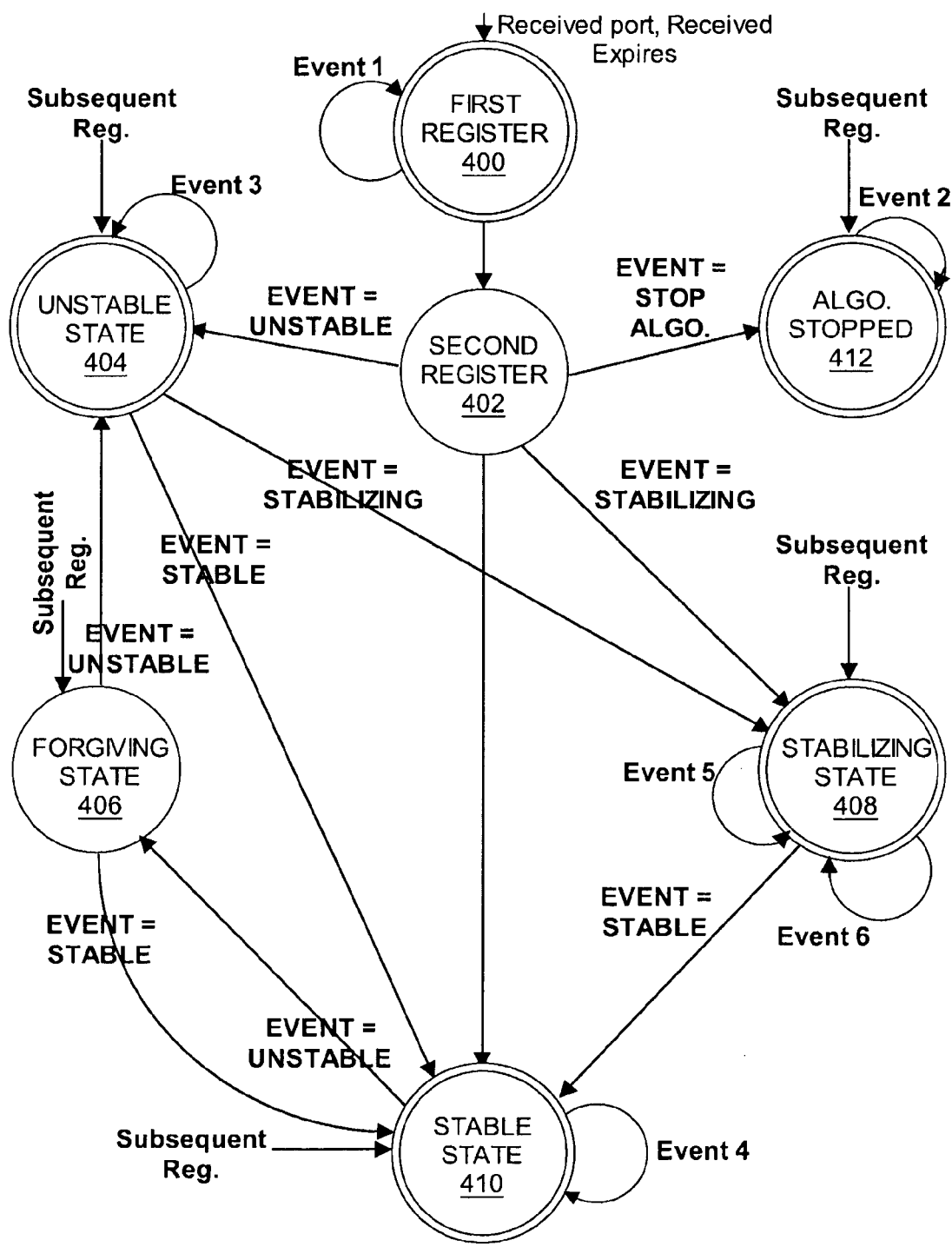
FIG. 4 is a state diagram for the process of determining and suitably adjusting the registration interval of an endpoint, according to an embodiment of the subject matter disclosed herein.

FIG. 4 illustrates a state diagram for the process of determination and adaptive adjustment of a registration interval of an endpoint, according to an embodiment of the subject matter disclosed herein. The state diagram can be implemented by registration interval manager 102 shown in FIG. 1 using a process such as the exemplary process shown in FIGS. 3A and 3B. Referring to FIG. 4, the state diagram includes a first register state 400, a subsequent register state 402, an unstable state 404, a forgiving state 406, a stabilizing state 408, a stable state 410, and a process stopped state 412. When the process enters a state, it awaits receipt of the next REGISTER message before determining whether to remain in the same state or proceed to another state.

The process begins and enters first register state 400 when it is determined that a REGISTER message is initially received from an endpoint that has not been registered. In state 400, if the received Expires value is less than the maximum registration value (Event 1), a 200 OK message is sent to the endpoint having an Expires value equal to the Expires value in the REGISTER message. Otherwise, if the received Expires value is greater than or equal to the maximum registration value, a 200 OK message is sent to the endpoint having an Expires value equal to the maximum registration value. The present registration value is set to Expires value in the 200 OK message, and the present port value is set to the port identifier contained in the REGISTER message. Next, the process proceeds to state 402 to await another REGISTER message from the endpoint.

At state 402, the registration interval manager may determine that the determination of binding interval is unstable, stable, or stabilizing based on a received REGISTER message from the endpoint. The optimal registration determination algorithm may be deemed unstable if it is determined that the Expires value in the REGISTER message is equal to the present registration value, the port identifier in the message is not equal to the present port value, and the final registration value is not set. In this instance, the current state changes to unstable state 404.

Further, at state 402, the optimal registration determination algorithm may be deemed stable if it is determined that the Expires value in the REGISTER message is equal to the present registration value and the final registration value is set. In this instance, the current state changes to stable state 410.

Further, at state 402, the optimal registration determination algorithm may be deemed stabilizing if it is determined that the Expires value in the REGISTER message is equal to the present registration value, the port identifier in the message is equal to the present port, and the final registration value is not set. In this instance, the current state changes to stabilizing state 408.

At state 402, if it is determined that the Expires value in the REGISTER message is less than the present registration value, the current state of the process may proceed to state 412 and accept the Expires value contained in the REGISTER message. Further, at 412, the interval registration module sends a 200 OK message with its Expires value being equal to the Expires value (Event 2). The optimal registration determination algorithm stops.

At unstable state 404, if the Expires value in the REGISTER message equals the maximum registration value (Event 2), the process is restarted. A 200 OK message with the Expires value set to the minimum registration value is sent to the endpoint. Further, the present registration port is set to the port number contained in the REGISTER message. The present registration value is set to the Expires value of the 200 OK message.

If, in unstable state 404, the Expires value in a received REGISTER message is greater than the minimum registration value, the Expires value is less than the maximum registration value, and the last registration value is less than the Expires value in the REGISTER message, the last registration value is set as the final registration value. Further, a 200 OK message having an Expires field set to the last registration value is sent to the endpoint. The final registration port is set equal to the received port number. In this instance, the current state changes to stable state 410.

If, in unstable state 404, the Expires value in a received REGISTER message is equal to the minimum registration value, a 200 OK message having an Expires field set to the Expires value in the received REGISTER message is sent to the endpoint. Further, the present registration port is set equal to the port number in the received REGISTER message. In this instance, the current state changes to stabilizing state 408.

In stable state 410, if it is determined that the port number in a received REGISTER message is not equal to the final registration port and the present port value the process proceeds to forgiving state 406. The algorithm forgives one change in port value due to the NAT device resetting after the final registration value has been determined. Otherwise, the process remains in stable state 410 on receipt of the REGISTER message. At this point irrespective of whether the process remains in stable state 410 or goes to the forgiving state 406, a 200 OK message having its Expires field set to the Expires value of the received REGISTER message, which is equal to the final registration value, is sent to the endpoint.

In forgiving state 406, on receipt of a REGISTER message, if it is determined that the present port value does not equal the final registration port and the port number in the received REGISTER message is not equal to the present port value, the process proceeds to unstable state 404. This indicates two consecutive REGISTER messages with different port numbers due to the change in NAT device or NAT device port binding interval. Further, on receipt of a REGISTER message, if it is determined that the port number of the received REGISTER message equals the present port value and the present port value does not equal the final registration port, the process proceeds to stable state 410, a 200 OK message with its Expires value set to the Expires value of the received REGISTER message is sent to the endpoint, and the present port value is set to the port number of the received REGISTER message (Event 3). This indicates that the NAT device may have reset resulting in the change of the port binding.

In stabilizing state 408, if the Expires value in a received REGISTER message equals the maximum registration value and the present stability counter equals the global stability counter, the process proceeds to stable state 410. The final registration value is set to the Expires value of the received REGISTER message, the final registration port is set equal to the port number in the received REGISTER message and a 200 OK message having the Expires value set to the Expires value of the REGISTER message is sent to the endpoint.

Further, in stabilizing state 408, if the Expires value in a received REGISTER message is less than the maximum registration value and the present stability counter is less than the global stability counter (Event 4), a 200 OK message having the Expires value set to the Expires value of the REGISTER message is sent to the endpoint. Further, the present stability counter is incremented.

In stabilizing state 408, if the Expires value in a received REGISTER message is less than the maximum registration value and the present stability counter is equal to the global stability counter (Event 5), the present registration interval is updated to the Expires value of the REGISTER message incremented by the global increment value. Further, a 200 OK message having its Expires value set to the updated present registration interval is sent to the endpoint. The counter is reset to zero. Further, the last registration value is set equal to the present registration value.

The present subject matter is described with specificity to meet statutory requirements. However, the description itself is not intended to limit the scope of this patent. Rather, it is contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in a computer program product or tangible media, such as floppy diskettes, CD-ROMs, hard drives, or any other machine-readable storage medium, wherein, when the program code is loaded into and executed by a machine, such as a computer, the machine becomes an apparatus for practicing the subject matter disclosed herein. In the case of program code execution on programmable computers, the computer will generally include a processor, a storage medium readable by the processor (including volatile and non-volatile memory and/or storage elements), at least one input device and at least one output device. One or more programs can be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the subject matter disclosed herein. When implemented on a general-purpose processor, the program code combines with the processor to provide a unique apparatus that operates to perform the processing of the present subject matter.

While the embodiments have been described in connection the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method of adaptively adjusting a registration interval of an endpoint, the method comprising:
   determining a registration interval for an endpoint associated with a binding defined at a network address translation device;
   determining a stability of the binding based on a first message received from the endpoint;
   adjusting the registration interval for the endpoint based on the determined stability of the binding;
   maintaining a present stability counter for the endpoint for indicating the stability of the binding; and
   maintaining a present registration value for indicating the adjusted registration interval for the endpoint at the binding,
   wherein determining the stability of the binding comprises:
      determining whether the binding for the endpoint at the network address translation device has changed to a different binding; and
      in response to determining that the binding for the endpoint has not changed to a different binding:
         incrementing the present stability counter for the endpoint at the binding;
         determining whether a value of the present stability counter is less than or equal to a value of a global stability counter;
         in response to determining the value of the present stability counter is less than or equal to the value of the global stability counter, sending a second message to the endpoint to set the registration interval for the endpoint to the present registration value; and
         in response to determining that the value of the present stability counter is not less than or equal to the value of the global stability counter:
            incrementing the present registration value by a global increment value; and
            sending a third message to the endpoint to set the registration interval for the endpoint to the incremented present registration value.

2. The method of claim 1, wherein adjusting the registration interval for the endpoint comprises:
   determining the registration interval based on a maximum registration value; and
   sending a fourth message to the endpoint to set the registration interval for the endpoint to the maximum registration value.

3. The method of claim 2, wherein sending the fourth message to the endpoint comprises sending, to the endpoint, a 200 OK message including an Expires value set to the maximum registration value.

4. The method of claim 1, comprising,
   receiving, from the endpoint, a REGISTER message including an Expires value; and
   wherein adjusting the registration interval comprises:
      determining whether the Expires value is greater than or equal to a maximum registration value;
      in response to determining the Expires value is greater than or equal to the maximum registration value, sending a fourth message to the endpoint to set the registration interval for the endpoint to the maximum registration value; and
      in response to determining the Expires value is not greater than or equal to the maximum registration value, sending a fifth message to the endpoint to set the registration interval for the endpoint to the Expires value.

5. The method of claim 1, comprising:
   receiving, from the endpoint, a REGISTER message including a first Expires value;
   determining whether the endpoint is registered with a registrar; and
   in response to determining the endpoint is registered:
      comparing the first Expires value to a maximum registration value; and
      sending, to the endpoint, a fourth message including a second Expires value based on the comparison to set the registration interval for the endpoint.

6. The method of claim 1, comprising:
   determining whether the endpoint is registered with a registrar;
   in response to determining the endpoint is registered with the registrar, comparing an Expires value contained in a fourth message received from the endpoint to the adjusted registration interval for the endpoint; and
   readjusting the registration interval for the endpoint based on the comparison of the Expires value to the adjusted registration interval.

7. The method of claim 1, comprising:
   determining whether the binding for the endpoint at the network address translation device has changed to a different binding; and
   in response to determining that the binding for the endpoint has changed to a different binding, resetting the present stability counter for the endpoint.

8. The method of claim 1, comprising:
   determining whether a predetermined number of messages have been received from the endpoint set at the registration interval;
   in response to determining the predetermined number of messages have been received from the endpoint at the registration interval:
      determining whether the present registration value is equal to a maximum registration interval; and
      in response to determining the present registration value is equal to the maximum registration interval, setting a final registration value to the present registration value, and sending a fourth message to the endpoint to set the registration interval for the endpoint to the present registration value.

9. A system for adaptively adjusting a registration interval of an endpoint, the system comprising:
   a memory;
   a registration interval manager configured to:
   determine a registration interval for an endpoint associated with a binding defined at a network address translation device;
   determine a stability of the binding based on a first message received from the endpoint;
   adjust the registration interval for the endpoint based on the determined stability of the binding
   maintain a present stability counter for the endpoint for indicating the stability of the binding;
   maintain a present registration value for indicating the adjusted registration interval for the endpoint at the binding;
   determine whether the binding for the endpoint at the network address translation device has changed to a different binding;
   in response to determining that the binding for the endpoint has not changed to a different binding:

increment the present stability counter for the endpoint at the binding;

determine whether a value of the present stability counter is less than or equal to a value of a global stability counter; and increment the present registration value by a global increment value in response to determining that the value of the present stability counter is not less than or equal to the value of the global stability counter; and wherein the system comprises an output module configured to:

send a second message to the endpoint to set the registration interval for the endpoint to the present registration value in response to determining the value of the present stability counter is less than or equal to the value of the global stability counter; and send a second message to the endpoint to set the registration interval for the endpoint to the incremented present registration value.

10. The system of claim 9, wherein registration interval manager is configured to determine the registration interval based on a maximum registration value, and wherein the system comprises an output module configured to send a fourth message to the endpoint to set the registration interval for the endpoint to the maximum registration value.

11. The system of claim 10, wherein the output module is configured to send, to the endpoint, a 200 OK message including an Expires value set to the maximum registration value.

12. The system of claim 9, wherein the system comprises an input module configured to receive, from the endpoint, a REGISTER message including an Expires value; and wherein the registration interval manager is configured to:

determine whether the Expires value is greater than or equal to a maximum registration value;

send a fourth message to the endpoint to set the registration interval for the endpoint to the maximum registration value in response to determining the Expires value is greater than or equal to the maximum registration value; and send a fifth message to the endpoint to set the registration interval for the endpoint to the Expires value in response to determining the Expires value is not greater than or equal to the maximum registration value.

13. The system of claim 9, comprising an input module configured to receive, from the endpoint, a REGISTER message including a first Expires value;

wherein the registration interval manager is configured to:

determine whether the endpoint is registered with a registrar; and in response to determining the endpoint is registered:

compare the first Expires value to a maximum registration value; and send, to the endpoint, a fourth message including a second Expires value based on the comparison to set the registration interval for the endpoint.

14. The system of claim 9, wherein the registration interval manager is configured to:

determine whether the endpoint is registered with a registrar;

compare an Expires value contained in a fourth message received from the endpoint to the adjusted registration interval for the endpoint in response to determining the endpoint is registered with the registrar; and readjust the registration interval for the endpoint based on the comparison of the Expires value to the adjusted registration interval.

15. The system of claim 9, wherein the registration interval manager is configured to:

determine whether the binding for the endpoint at the network address translation device has changed to a different binding; and reset the present stability counter for the endpoint in response to determining that the binding for the endpoint has changed to a different binding.

16. The system of claim 9, wherein the registration interval manager is configured to:

determine whether a predetermined number of messages have been received from the endpoint set at the registration interval;

in response to determining the predetermined number of messages have been received from the endpoint at the registration interval:

determine whether the present registration value is equal to a maximum registration interval; and in response to determining the present registration value is equal to the maximum registration interval, set a final registration value to the present registration value, and send a fourth sec-end message to the endpoint to set the registration interval for the endpoint to the present registration value.

17. A computer program product comprising computer-executable instructions embodied in a non-transitory computer-readable medium for performing steps comprising:

determining a registration interval for an endpoint associated with a binding defined at a network address translation device;

determining a stability of the binding based on a first message received from the endpoint;

adjusting the registration interval for the endpoint based on the determined stability of the binding;

maintaining a present stability counter for the endpoint for indicating the stability of the binding; and maintaining a present registration value for indicating the adjusted registration interval for the endpoint at the binding, wherein determining the stability of the binding comprises:

determining whether the binding for the endpoint at the network address translation device has changed to a different binding; and in response to determining that the binding for the endpoint has not changed to a different binding:

incrementing the present stability counter for the endpoint at the binding;

determining whether a value of the present stability counter is less than or equal to a value of a global stability counter;

in response to determining the value of the present stability counter is less than or equal to the value of the global stability counter, sending a second message to the endpoint to set the registration interval for the endpoint to the present registration value; and in response to determining that the value of the present stability counter is not less than or equal to the value of the global stability counter:

incrementing the present registration value by a global increment value; and sending a third message to the endpoint to set the registration interval for the endpoint to the incremented present registration value.

18. The computer program product of claim 17, wherein adjusting the registration interval for the endpoint comprises:
   determining the registration interval based on a maximum registration value; and
   sending a fourth message to the endpoint to set the registration interval for the endpoint to the maximum registration value.

19. The computer program product of claim 18, wherein sending the fourth message to the endpoint comprises sending, to the endpoint, a 200 OK message including an Expires value set to the maximum registration value.

20. The computer program product of claim 17, comprising
   receiving, from the endpoint, a REGISTER message including an Expires value; and
   wherein adjusting the registration interval comprises:
      determining whether the Expires value is greater than or equal to a maximum registration value;
      in response to determining the Expires value is greater than or equal to the maximum registration value, sending a fourth message to the endpoint to set the registration interval for the endpoint to the maximum registration value; and
      in response to determining the Expires value is not greater than or equal to the maximum registration value, sending a fifth message to the endpoint to set the registration interval for the endpoint to the Expires value.

21. The computer program product of claim 17, comprising:
   receiving, from the endpoint, a REGISTER message including a first Expires value;
   determining whether the endpoint is registered with a registrar; and
   in response to determining the endpoint is registered:
      comparing the first Expires value to a maximum registration value; and
      sending, to the endpoint, a fourth message including a second Expires value based on the comparison to set the registration interval for the endpoint.

22. The computer program product of claim 17, comprising:
   determining whether the endpoint is registered with a registrar;
   in response to determining the endpoint is registered with the registrar, comparing an Expires value contained in a fourth message received from the endpoint to the adjusted registration interval for the endpoint; and
   readjusting the registration interval for the endpoint based on the comparison of the Expires value to the adjusted registration interval.

23. The computer program product of claim 17, comprising:
   determining whether the binding for the endpoint at the network address translation device has changed to a different binding; and
   in response to determining that the binding for the endpoint has changed to a different binding, resetting the present stability counter for the endpoint.

24. The computer program product of claim 17, comprising:
   determining whether a predetermined number of messages have been received from the endpoint set at the registration interval;
   in response to determining the predetermined number of messages have been received from the endpoint at the registration interval:
      determining whether the present registration value is equal to a maximum registration interval; and
      in response to determining the present registration value is equal to the maximum registration interval, setting a final registration value to the present registration value, and sending a fourth message to the endpoint to set the registration interval for the endpoint to the present registration value.

* * * * *